(12) United States Patent
Baenziger

(10) Patent No.: US 7,740,262 B2
(45) Date of Patent: Jun. 22, 2010

(54) EASY RIDING BICYCLE

(75) Inventor: Benno Baenziger, San Diego, CA (US)

(73) Assignee: Electra Bicycle Company, LLC, Vista, CA (US)

( * ) Notice: Subject to any disclaimer, the term of this patent is extended or adjusted under 35 U.S.C. 154(b) by 0 days.

(21) Appl. No.: 10/962,910

(22) Filed: Oct. 12, 2004

(65) Prior Publication Data

US 2005/0161897 A1    Jul. 28, 2005

Related U.S. Application Data

(60) Provisional application No. 60/510,660, filed on Oct. 10, 2003.

(51) Int. Cl.
*B62K 1/00* (2006.01)
(52) U.S. Cl. .................... 280/274; 280/281.1
(58) Field of Classification Search ............... 280/274, 280/270, 281.1, 288.1; 74/551.1
See application file for complete search history.

(56) References Cited

U.S. PATENT DOCUMENTS

| 2,147,732 A | * | 2/1939 | Boynton | 280/261 |
| 4,337,962 A | * | 7/1982 | Allen et al. | 280/279 |
| 4,480,848 A | * | 11/1984 | Georgiev | 280/288.1 |
| 4,582,335 A | * | 4/1986 | Paioli et al. | 280/278 |
| 5,755,141 A | * | 5/1998 | Chen | 74/551.3 |
| 5,951,034 A | * | 9/1999 | Mayo | 280/288.1 |
| 6,695,335 B1 | * | 2/2004 | Gaastra | 280/288.1 |
| 6,729,692 B1 | * | 5/2004 | Chou | 297/463.1 |
| 2004/0245744 A1 | * | 12/2004 | Emang et al. | 280/281.1 |

FOREIGN PATENT DOCUMENTS

| CA | 2 104 836 A1 | 2/1995 |
| EP | 0 870 672 A | 10/2008 |

OTHER PUBLICATIONS

Advanced Transportation Products, Inc., Vision 2002 Products, tri-fold flyer, 2002.
Advanced Transportation Products, Inc., Vision Recumbent Bicycles sales brochure, with enlarged photo of V72, 2002.
Advanced Transportation Products, Inc., The V70 and V72 "Thoroughbred" uprights, sales flyer, 2002.
Giant Bicycles, sales brochure, 2002, pp. 42 and 48.
Giant Bicycles, Revive sales brochure, 2002.
Advanced Tranportation Products, Inc.,; Vision Recumbent Bicycles sales brochure, with enlarged photo of V72, 2002, 5 pgs.
International Search Report dated Oct. 14, 2008.

* cited by examiner

*Primary Examiner*—Tony H. Winner
(74) *Attorney, Agent, or Firm*—Bingham McCutchen LLP

(57) ABSTRACT

A bicycle frame may include handlebars having a rise and range of handlebar angle adjustment and a seat tube mounted at an angle a fixed distance rearward of the bottom bracket. The combination of the handlebar rise, the fixed distance and seat tube angle, as well as the ranges of handlebar angle and saddle height adjustments, result in the handlebar angle and saddle height being sufficiently adjustable so that almost all riders can comfortably sit upright on the saddle using substantially the same leg extension to place a foot flat on the ground when stopped and while pedaling.

30 Claims, 4 Drawing Sheets

EASY RIDING BICYCLE

RELATED APPLICATIONS

This application claims priority of copending U.S. provisional patent application Ser. No. 60/510,660 filed Oct. 10, 2003.

BACKGROUND OF THE INVENTION

1. Field of the Invention

The present invention is related to bicycles and in particular, to bicycle designs which are easier to ride.

2. Description of the Prior Art

Conventional bicycles, often referred to as diamond frame bicycles, are available in many shapes and sizes. Conventional bicycle frames include a horizontal chain stay running between the axle of the rear bicycle wheel and the bottom bracket through which the pedals are mounted for rotation. The seat tube, which supports the seat or saddle, is typically welded to the bottom bracket. The down tube, running from the bottom bracket to the head tube within which the front wheel rotates for steering, is also typically welded to the bottom bracket. A top tube, running from the rear wheel axle to the head tube, also serves to stabilize the seat tube and may be made from a seat stay between the rear axle and the seat tube plus an upper tube from the seat tube to the head tube.

Conventional bicycle frames of this type are called diamond frames because the seat tube, chain stay, and seat stay form a first triangle and the seat tube, down tube and upper tube generally form a second, connected triangle with the down and upper tubes connected close to each other at the head tube. In such conventional bicycle frames, the bottom bracket through which the pedals are mounted for rotation, serves as a common joint between the triangles and is welded or otherwise affixed to the chain stay, seat tube and down tube. The top tube may be mounted lower towards the ground in versions requiring a lower stand-over height, that is, the height of the bicycle frame between a rider's legs when standing with both feet on the ground.

When conventional bicycles are adjusted for a particular rider, the seat tube is typically extended so that the seat height allows the rider to extend one leg to reach the related pedal in it's furthest forward position. The proper full leg extension while pedaling, called herein the "proper full leg extension for pedaling", includes a minor bend at the knee so that the leg is not locked. When riding, the rider is typically leaning forward. When stopped, the rider is typically required to extend the toes on one foot to reach the ground and often will tilt the bicycle toward the foot touching the ground in order to better reach the ground. That is, when stopped, the seat is typically positioned too high for the rider to comfortably put both feet flat on the ground without tilting the bicycle.

Recumbent bicycles were developed to reduce the strain on the rider's back by moving the bottom bracket and pedals further forward. This permits the rider to lean back and to operate the pedals at a different, less stressful angle. Allowing the rider to lean back, and moving the bottom bracket and pedals further forward, increases the wheelbase of the bicycle. When stopped, the rider can typically reach the ground with both feet. Some riders consider this to be an awkward position because the rider's weight is behind the rider's feet rather than above the rider's feet as it would be in a conventional bicycle. In addition, the rider cannot stand up while pedaling as is commonly done for increased performance for example when pedaling uphill.

One currently popular variation for bicycle frames is called the "chopper" in which the bottom bracket and pedals are moved forward from the conventional bicycle frame position, but not as far forward as they would be in a recumbent bicycle. The rider sits relatively erect with the handle bars extended toward the rider. Conventional chopper designs typically provide neither the comfort and convenience of a conventional bicycle frame design nor the reduced back strain of the recumbent designs.

What is needed is a bicycle design in which the bicycle is comfortable to learn to ride, to stand with and to ride. In particular, what is needed is a bicycle frame design in which the rider can sit upright, stand up while pedaling if desired and being able to put one or both feet flat on the ground when stopped and the seat is adjusted for proper leg extension for pedaling.

SUMMARY OF THE INVENTION

In accordance with a first aspect, a bicycle design is disclosed having a chain stay supporting a rear bicycle wheel for rotation at a rearward end of the chain stay, a bottom bracket affixed to the forward end of the chain stay for supporting bicycle pedals for rotation to propel the rear bicycle wheel, a head tube for supporting a steerable front fork assembly including handle bars and front bicycle wheel, top tube and down tubes affixed between the head tube and the rearward and forward ends of the chain stay, and a seat tube for supporting a saddle and the seat affixed to the top tube, the seat tube also affixed to the chain stay at a fixed distance rearward of the bottom bracket wherein the frame members are sized and configured (a) so that a rider sitting on the saddle can comfortably fully extend one leg to place a foot flat on the ground or to use proper leg extension while pedaling, and/or (b) so that a rider sits comfortably upright on the saddle while pedaling, and/or (c) so that the rider can pedal while standing up, and and/or (d) so that increasing the height of the saddle by extending the seat tube for a taller rider increases the space between the saddle and the handle bars.

The fixed distance may be on the order of about the height above ground of a heel of the rider's foot when the foot is outstretched to reach the ground and/or on the order of about a radius of a circle through which the pedals are moved during pedaling of the bicycle. The seat tube is affixed to the chain stay at an angle from the horizontal in the range of about 62° to 72°, 64° to 69° or preferably at an angle of about 66.5°. The head tube may be affixed to the top and down tubes at an angle from the horizontal in the range of about 64° to 72°, 66° to 70° or preferably at an angle of about 68°. The angle of the head tube may preferably exceed the angle of the seat tube by about 1.5°.

A. In a first aspect, a bicycle frame may have handlebars having a substantial rise and range of handlebar angle adjustment and a seat tube frame member adjustably supporting a saddle at a range of saddle heights and mounted at a fixed distance rearward of the bottom bracket at a seat tube angle, wherein a combination of the handlebar rise, the fixed distance and the seat tube angle, as well as the ranges of handlebar angle and saddle height adjustments, result in the handlebar angle and saddle height being sufficiently adjustable so that almost all riders, for whom the saddle height can be adjusted for the rider to comfortably sit upright on the saddle and use the proper full leg extension while pedaling, can also comfortably reach the handlebars while riding and fully extend one leg to place a foot flat on the ground while stopped. The rider may use substantially the same leg extension while pedaling and to place a foot flat on the ground while stopped. Almost all riders have a similar riding experience when reaching the handlebars while riding and extending a leg to place a foot flat on the ground while stopped.

B. The saddle height may be adjustment by as much as on the order of about 12". The handlebar rise may be at least 2" ad/or in the range of about 2" to about 6". The handlebar angular adjustment may be in the range of about one quadrant and the handle grips positioned so that most riders can comfortably grip the handle grips throughout the range of handlebar angular adjustment. The fixed distance may be in the range of about 4" to 8" and provided by a chain stay extension frame member mounted between the chain stay frame member and the bottom bracket. The range of handlebar angular adjustment may be on the order of about one quadrant.

C. The invention seat tube may be mounted at a seat tube angle in the range of about 62° to 72° and/or in the range of about 64° to 69°. The head tube may be mounted at a head tube angle in the range of about 64° to 72° and/or in the range of about 66° to 70° and at an angle greater than the seat tube angle, for example by about 1.5°. The rider's compartment between the saddle and handlebars may change in size substantially proportionally as the saddle height and handlebar angle are adusted for the rider's height.

D. In another aspect, a method of producing bicycles may include using a bicycle frame with a seat tube mounted behind a bottom bracket at a distance of about a radius of a circle of revolution of the pedals, adding handlebars having a rise and a range of angular adjustment for rider's height and using values for the distance, rise and range of angular adjustment so that saddle height and angular adjustment permit most riders to comfortably sit upright while pedaling at a proper leg extension and extend a foot flat on the ground when stopped.

E. The rise may be at least 2" and the range of angular adjustment may be on the order of one quadrant. The seat tube may be mounted at an angle in the range of about 62° to 72° or in the range of about 64° to 69° and preferably on the order of about 66.5°.

DETAILED DESCRIPTION OF THE PREFERRED EMBODIMENT(S)

In a conventional or diamond frame bicycle when the saddle is lowered enough so that the rider can put one or both feet flat on the ground, riding or pedaling the bicycle is difficult because the distance from the saddle to the pedal is typically too short for the proper full leg extension for pedaling.

Figure 1:
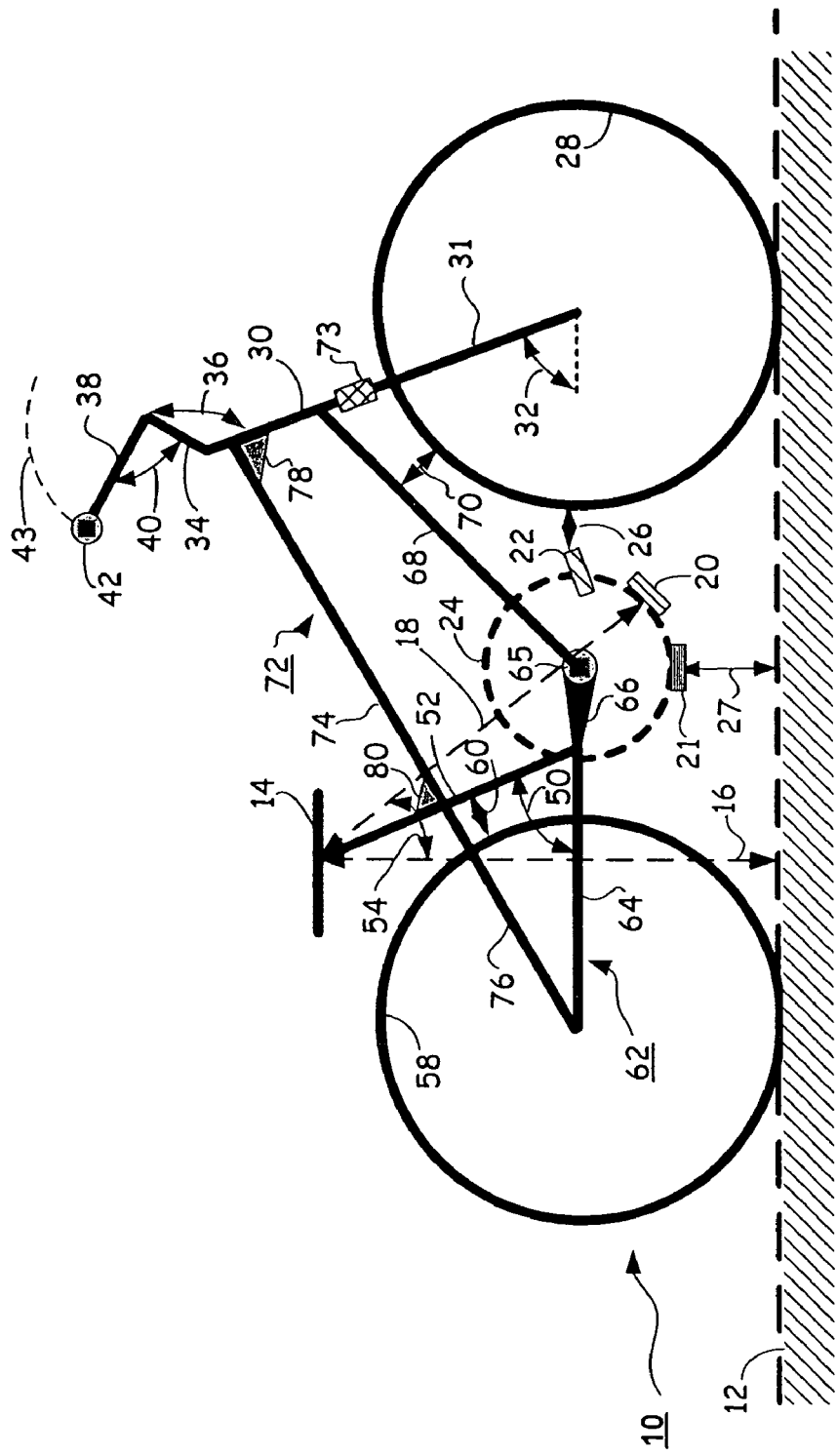
FIG. 1 is a side view of a bicycle according to the present disclosure adjusted for a short rider.

Referring now to FIG. 1, one way to understand the bicycle frame design disclosed herein is to imagine a rider sitting on saddle 14 with one of his feet flat on the ground as illustrated by leg extension 16, and then the rider lifts his leg by rotating it around the hip joint and keeping his leg fully but comfortably extended at the proper full leg extension for pedaling until it is high enough off the ground to be in a suitable position to pedal the bicycle as illustrated by leg extension 18. By locating the furthest pedal point from the saddle, illustrated as pedal point 20, and then positioning bottom bracket 65 to support the pedal at pedal point 20, the rider may put one or more feet flatly on the ground when stopped and also comfortably extend his leg to the proper full leg extension for pedaling.

As shown in FIG. 1, extendable seat tube 52, which includes a seat post slidably engaged in the tube for supporting the saddle, was moved back from its conventional location at bottom bracket 65 by the insertion of chain stay extension or horn 66 between chain stay yoke 64 and bottom bracket 65. Although a straight tube is preferred, the same effect can be achieved with a tube which is bent or curved tube at the bottom toward the bottom bracket. The length of horn 66, is preferably in the range of about 4" to about 8" and more preferably about 6". The horn tube length is about equal to the length of a pedal crank arm. It is also about or the height of the rider's heel above the ground when sitting on a properly adjusted seat of a conventional frame and extending his toes to reach the ground. Horn 66 positions pedal point 20 at the appropriate position for proper leg extension while pedaling. In addition, the insertion of horn 66 expands the rider's compartment space.

Referring now to FIG. 1, bicycle 10 is shown on ground level 12. Saddle 14 is shown in a lower position, suitable for example, for a shorter rider at about 4'10" tall. Leg dimension line 16 represents the distance from saddle 14 to ground 12 so that the rider can sit in saddle 14 and position one or both feet flat on ground 12. Leg dimension line 18 represents the distance from saddle 14 to pedal position 20 at which the rider's leg is extended at the proper full leg extension for pedaling. Leg dimensions 16 and 18 are substantially equal. In practice, however, people tend to extend their legs more fully while standing than when fully extending one leg to pedal a bicycle, so that the leg dimensions are not exactly equal, but the difference is relatively slight.

Pedal position 22 represents the most forward pedal position on pedal crank circle 24. Front wheel clearance dimension 26 represents the required minimum clearance between pedal position 22 and front wheel 28 to permit front wheel 28 to turn freely without interference between the rider's foot at pedal position 22 and the closest part of front wheel 28. Crank clearance dimension 27 represents the ground clearance between pedal position 21 and ground 12.

Front fork 31, in which front wheel 28 is mounted for rotation, extends from the center of front wheel 28, upward at head tube angle 32, appropriate for comfortable steering. In the bicycle frame disclosed, head tube angle 32 is preferably 68°, but angles in the range of 66° to 70° work well and angles in the range of 64° to 72° may be suitable in many circumstances. Front fork 31 is mounted in head tube 30 for steering rotation by handle bars 38. Adjustable stem 34 is positioned at the top of head tube 30 to rotate with front fork 31 and is shown positioned at angle 36, leaning in the direction of forward travel of bicycle 10. Handle bars 38 are mounted through an opening at the end of adjustable stem 34 and are shown positioned at angle 40 to stem 34.

Figure 4:
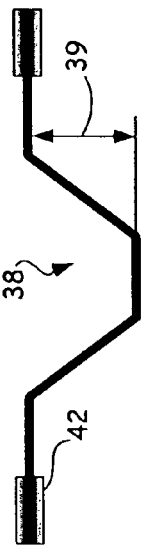
FIG. 4 is a top view of the handle bars of the bicycles shown in FIGS. 1 and 3.

Handle bars 38 preferably have a rise, shown as dimension 39 in FIG. 4, of about 4" but rises in the range of 2" to 6" may also be used. Handle grips 42 are positioned at the end of handle bars 38. The position of handle grips 42 may be adjusted to suit a comfortable arm reach of the rider along handgrip upper quadrant 43 to permit the rider to be seated in an upright position on saddle 14. Handle bars 38 are extended somewhat to be able elevate handle grips 42 in addition to positioning the hand grips rearward toward the rider.

Referring now again to FIG. 1, chain stay 62 runs from the center or axle of rear wheel 58 forward to bottom bracket 65. Chain stay 62 may include rearward chain stay yoke 64, in which rear wheel 58 is mounted for motion, and forward chain stay horn 66. The lower end of seat tube 52 is positioned along chain stay 62, preferably at a strong point, such as the intersection of chain stay yoke 64 and chain stay horn 66. The term chain stay horn is used to designate the support member between the chain stay yoke and bottom bracket. In a preferred embodiment, this support member may be somewhat horn or cone shaped as it increases in diameter, from its rigid mounting to the tubes or other members forming seat tube 52 and yoke 64, to be affixed to bottom bracket 65.

Chain stay 62, bottom bracket 65, upper and down tubes and 68, head tube 30 and seat tube 52 form the frame members of the frame of bicycle 10 and generally correspond to equivalent frame members of conventional diamond bicycle frames.

Figure 2:
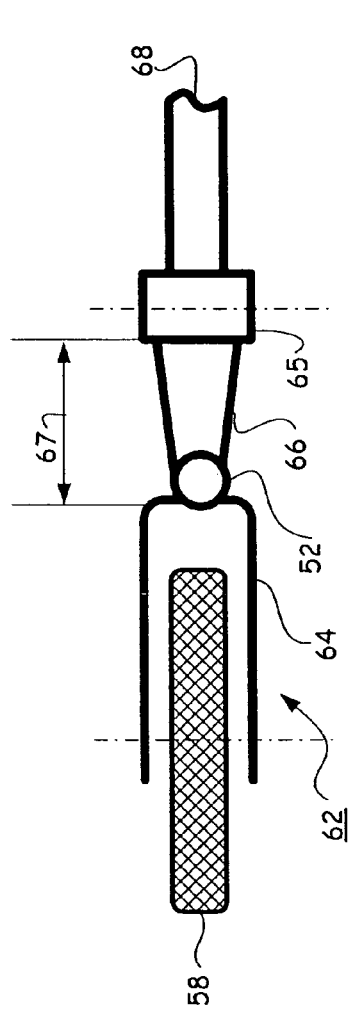
FIG. 2 is a top cut away view of the rear wheel and chain stay portions of the bicycle shown in FIG. 1.

Referring now to FIG. 2, a top view of the above described portion of frame 10 including chain stay 62 is shown in greater detail. In particular, rear wheel 58 is supported for rotation by chain stay yoke 64 of chain stay 62. Chain stay horn 66 and seat tube 52 are welded or otherwise affixed to the forward portion of chain stay yoke 64. Bottom bracket 65, in which the pedals are mounted for rotation, is welded or otherwise affixed to the forward portion of chain stay horn 66 and also supports down tube 68. Dimension 67 represents the length of chain stay horn 66. Chain stay horn 66 is used to move bottom bracket 65 forward of the point of support for seat tube 52 on chain stay yoke 64 so that the rider is in a relatively upright position when operating the pedals mounted for motion in bottom bracket 65.

Dimension 67 may conveniently be on the order of the typical distance above the ground of the rider's heel when a conventional bicycle is stopped. That is, when a conventional bicycle is stopped, the rider must typically extend the toes on the leg being used to support the bicycle in order to reach the ground. The distance between the rider's heel and the ground therefore represents the portion of the height of seat 14 above the ground that prevents the rider from resting his foot flat on the ground. In order to permit the rider to put one or both feet flat on the ground when the bicycle is stopped, seat 14 may be positioned lower by about dimension 67 so that the rider's foot when extended downward is comfortably placed flat on the ground while chain stay horn 66 moves bottom bracket 65 sufficiently forward so that the rider's foot at the proper leg extension for pedaling reaches the pedal is at its furthest distance from the rider, shown as pedal position 20 in FIG. 1. Alternately, dimension 67 may be on the order of the radius of the crank circle, that is, the length of the pedal arm or support member extending from the center of bottom bracket 65 to the axis of rotation of the pedal. Dimension 67 may be in the range of about 4" to 8" or about 6". In a preferred embodiment, dimension 67 is sufficient when seat 14 is properly adjusted for the proper leg extension while pedaling for the rider to comfortably fully extend one or both legs to place his feet flatly on the ground.

Moving the pedals forward by about dimension 67 and lowering seat 14 by about the same amount, with regard to a conventional frame in which the chain stay, seat tube and down tube are all affixed to bracket 65, allows the rider to put one or both feet flat on the ground when stopped while providing the proper full leg extension for pedaling. This arrangement also puts the rider in a more natural and comfortable upright riding position while making it more convenient for the rider to hold the bicycle upright while standing or stopping.

Referring now again to FIG. 1, seat tube 52 is affixed to chain stay horn 66 and chain stay yoke 64 by welding or other suitable means. Seat tube angle 50, between horizontal chain stay 62 and seat tube 52 is preferably on the order of about 66.50, but angles in the range of about 64° to 69° work well and angles in the range of 620 to 720 may also be useful.

Rear wheel 58 may be positioned as far forward as possible to minimize the wheelbase of bicycle 10, but rear wheel 58 may be positioned a clearance dimension 60 behind seat tube 52.

Down tube 68 is connected to chain stay 62, and in particular to chain stay horn 66, at bottom bracket 65 and runs to a suitable position along head tube 30 so that closest dimension 70 provides clearance for front wheel 28 and/or a front fender optionally, down tube 68 may be positioned along head tube 30 to provide sufficient space in which suspension support 73 may be positioned above front yoke 31. Upper tube 72 runs forward from the center of rear wheel 58 just below the top of head tube 30. Upper tube 72 may preferably be affixed to seat tube 52 by forming upper tube 72 in two sections, top tube 74 between head tube 30 and seat tube 52 and seat stay 76 between seat tube 52 and the rearward end of chain stay yoke 64 at the axle of rear wheel 58. For a lady's model bicycle, the rearward end of top tube 74 may be positioned lower along seat tube 52, substantially below the forward end of seat stay 76.

Forward gusset 78 and rear gusset 80, positioned between the bottom of upper tube 72 and head tube 30, and between the top of upper tube 72 and seat tube 52, add considerable strength and rigidity to the frame of bicycle 10. These gussets may be used to compensate for the loss of rigidity resulting from moving the lower end of seat tube 52 from bottom bracket 65, where it would likely be positioned in a convention bicycle frame, to the end of chain stay horn 66 affixed to chain stay yoke 64. In a preferred embodiment, the diameter of the forward end of chain stay horn is increased to provide the most support to bottom bracket 65. In other words, the forward end of chain stay horn 66 may be formed to include an integral gusset to resist, for example, twisting forces applied by down tube 68.

The size of front and read rear wheels 28 and 58 may range from 12" to 27" (or size 700C), but for adults from 4'6" to 6'10", a wheel size of 26" is currently preferred.

Figure 3:
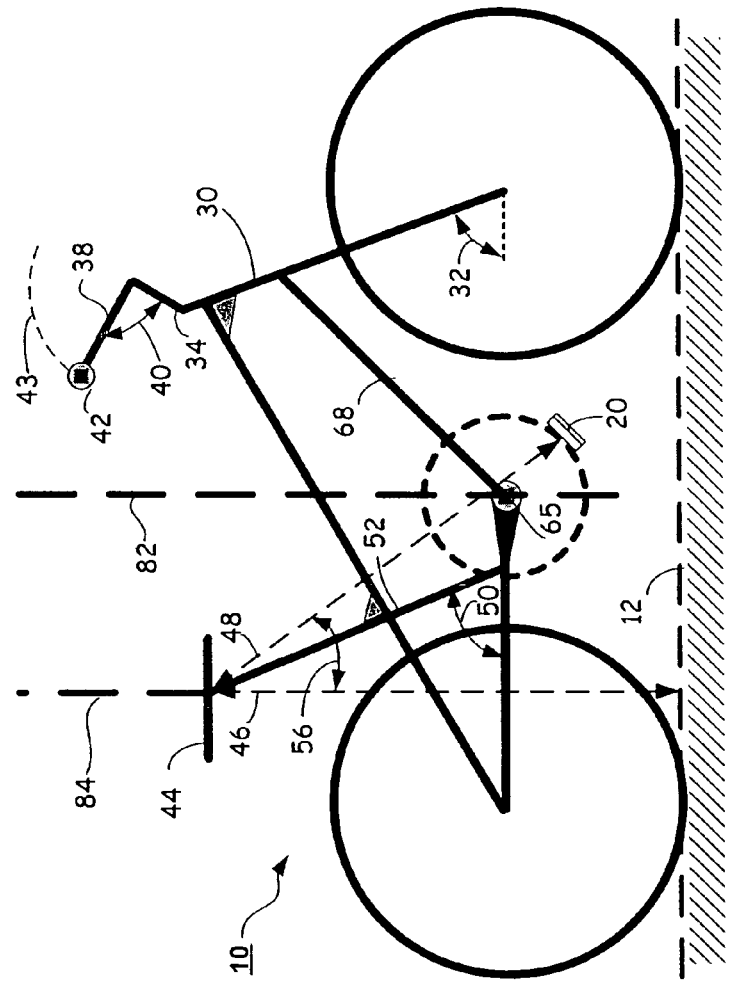
FIG. 3 is a side view of the bicycle shown in FIG. 1 adjusted for a taller rider.

Referring now to FIG. 3, a single frame size of bicycle 10 may be manufactured, shipped, sold and used for a wider range of rider sizes from a shorter to a taller rider, by adjusting the position of hand grips 42 and the position of saddle 14 in seat tube 52. Unlike conventional bicycle designs, the rider compartment space, that is the space between the saddle or seat 44 and seat tube 52, increases as bicycle 10 is adjusted for a taller rider. The increase in the rider compartment space results from the relaxed position of the seat tube, that is, the seat tube angle as well both the fact that the head tube angle is slightly larger and the fact that there is a significant rise in the handle bars. In particular, while the height of the saddle may be adjusted by as much as about 12" to 15" by repositioning the seat post within the seat tube, the height of the handle bars may be adjusted on the order of about 2". These adjustments are preferably made proportionally so that, for example, when the seat is adjusted halfway up, at about 6" to about 7.5", the handle bar is also adjusted about halfway up, at about 1".

The additional range of adjustment for the taller rider's outstretched arms is accomplished by rotating handle bars 42 through an arc by adjusting handle bar angle 40.

The leg dimensions also increase for a taller rider, when the seat is raised, allowing both the taller and shorter rider to both put their feet flat on the ground to support bicycle 10 when stopped when the seat is adjusted to provide proper full leg extension for pedaling to reach pedal position 20.

It is important to note that the increase in the rider compartment space and leg dimensions upon adjustment for a taller rider results from the difference between seat tube angle 50 and head tube angle 32. In a preferred embodiment head tube angle 32 exceeds seat tube angle 50 by about 1.5°. It is also important to note that the preferred angles for seat tube angle 50 discussed above permit a broad range of adjustment for the height of the rider while retaining the desirable qualities of allowing a rider to place one or more feet flat on the ground when stopped without tilting the bicycle, the proper full leg extension for pedaling, as well as the upright riding position as discussed above.

The position of saddle 44, suitable for a taller rider perhaps 6'21" tall, may be determined in the same manner as the position of seat 14 shown in FIG. 1 for a shorter rider. In particular, leg dimension 46 represents the distance required from saddle 44 for the taller rider to place one or both of his feet flat on the ground while leg dimension 48 represents the distance to pedal position 20 for a proper full leg extension for pedaling. Saddle 44 is thereby positioned above and to the rear of saddle 14 at seat tube angle 50. Seat tube 52 is positioned at seat tube angle 50 so that a saddle, such as saddle 14 can be adjusted in height along angle 50 to accommodate both the taller and shorter rider. The position of handle grips 42 may be adjusted to suit a comfortable arm reach of the taller rider along handgrip quadrant 43 to permit the taller rider to also be seated in an upright position on saddle 44 while pedaling.

The included angle 54 between the leg dimension 16 and 18 for the shorter rider, shown in FIG. 1, is on the order of 45° while included angle 56 between leg dimensions 46 and 48 for the taller rider shown, in FIG. 3, is on the order of about 37°.

A further advantage of the configurations of bicycle 10 shown herein is the ability to ride while standing up. As noted above, it is common with conventional bicycles to occasionally stand up while pedaling for example to ride up a steep hill. This advantage is lost with conventional recumbent bicycles, but is retained in bicycle 10. In particular, as clearly illustrated by stand up position reference 82, stand up pedaling is easily accomplished because head tube angle 32 and the adjustments permitted for the position of hand grips 42, permit the rider to stand up without interference. Upright riding position reference 84 is also illustrated for clarity.

Figure 5:
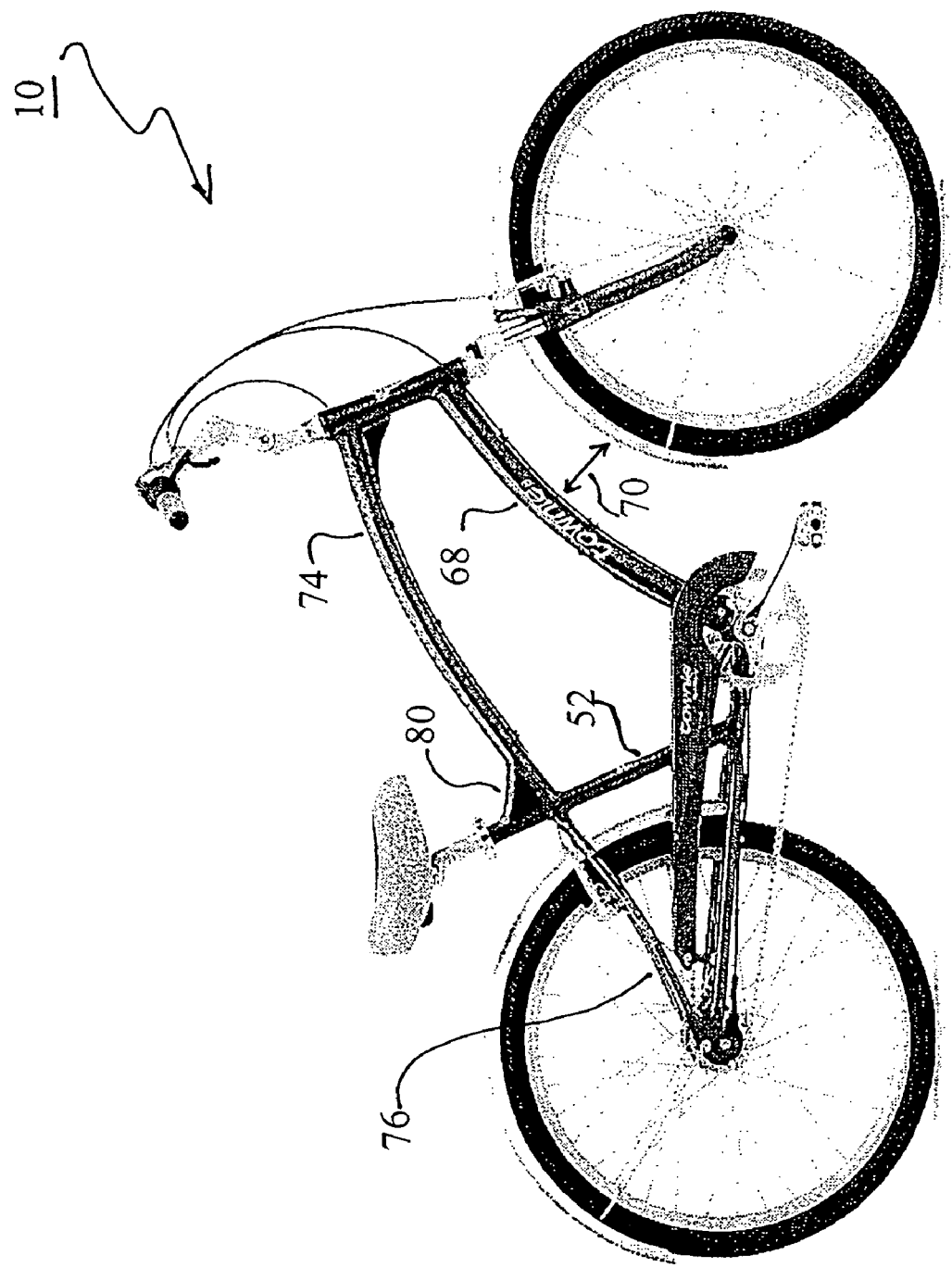
FIG. 5 is an illustration of a preferred embodiment of the bicycles shown in FIGS. 1 and 3, including chain, gearing, brakes, fenders and other components.

Referring now to FIG. 5, an alternate embodiment of bicycle 10 is shown in which top tube 74 may be formed in a convex upward curve permitting the lower end of top tube 74 to be positioned lower along seat tube 52. The lowering of the end of top tube 74 reduces the stand-over height for the comfort of the rider. Gusset 80 between top tube 74 and seat tube 50 provides additional mechanical support and rigidity. Down tube 68 is formed in a similar and compatible convex downward curve which maximizes closest dimension 70, for example to permit the use of a fender and/or mudguard. Gussets 78 and 80 are also shown with curved lower and upper edges, respectively which further enhance the rigidity, strength and overall appearance of bicycle 10.

Further, seat stay 76 may also be formed in a slight concave upward angle providing a pleasing sinuous continuation of top tube 74. Fenders, brakes, tires and rims, a wide seat, a chain guard and an in-hub transmission are also shown.

Figure 6:
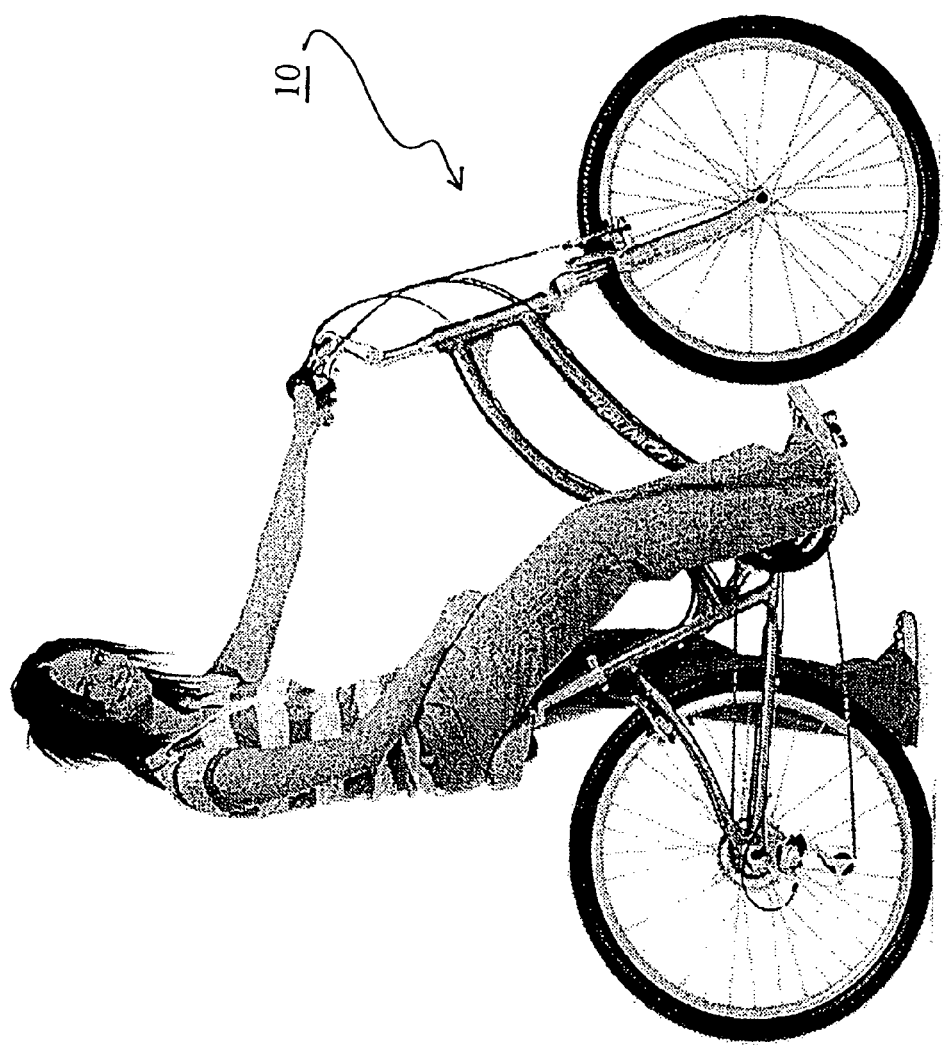
FIG. 6 is an illustration of a lady's model of the bicycle shown in FIG. 5 with a rider.

Referring now to FIG. 6, in another alternate embodiment, a lady's version of bicycle 10 with a rider is shown in which top tube 74 is formed in a upwardly convex curve while the lower end of top tube 74 is positioned substantially lower along seat tube 52. Lowering the end of top tube 74 further reduces the stand-over height for the comfort of the rider. Down tube 68 is formed in a similar and compatible convex curve which maximizes closest dimension 70. Gussets 78 and 80 are also shown with curved lower and upper edges, respectively which further enhance the appearance of bicycle 10.

Further, seat stay 76 is formed in a slight concave angle providing a pleasing sinuous continuation of top tube 74. Fenders, brakes, tires and rims, a wide seat, a chain guard and an in-hub transmission are also shown.

The invention claimed is:

1. A bicycle frame, comprising:
a chain stay frame member supporting a rear bicycle wheel;
a bottom bracket frame member supporting bicycle pedals;
a head tube frame member supporting a steerable front fork assembly including handle bars and a front bicycle wheel, the handlebars having a rise and range of handlebar angle adjustment;
a straight, curved or angled seat tube frame member adjustably supporting a saddle at a range of saddle heights and mounted at a fixed distance rearward of the bottom bracket at a seat tube angle, wherein the seat tube is mounted, or a seat tube axis as extended from a saddle insertion point, intersects the chain stay or a horn at a distance of at or within a radius of a circle of revolution of the pedals; and
one or more interconnecting tube frame members interconnecting the head tube, seat tube and chain stay frame members and the bottom bracket,
wherein a combination of the handlebar rise, the fixed distance and the seat tube angle, as well as the ranges of handlebar angle and saddle height adjustments, result in the handlebar angle and saddle height being sufficiently adjustable so that almost all riders, for whom the saddle height can be adjusted for the rider to comfortably sit upright on the saddle and use the proper full leg extension while pedaling, can also comfortably reach the handlebars while riding and fully extend one leg to place a foot flat on the ground while stopped.

2. The invention of claim 1, wherein the rider sitting upright in the saddle is able to use substantially the same leg extension when using proper leg extension while pedaling and when fully extending one leg to place a foot flat on the ground while stopped.

3. The invention of claim 1 wherein almost all riders for whom the saddle height can be adjusted for the rider to comfortably sit upright on the saddle and use the proper full leg extension while pedaling have a similar riding experience when reaching the handlebars while riding and extending a leg to place a foot flat on the ground while stopped.

4. The invention of claim 3, wherein the saddle height may be adjusted by as much as on the order of about 12".

5. The invention of claim 3 wherein the handlebar rise is at least 2".

6. The invention of claim 3 wherein the handlebar angular adjustment is in the range of about one quadrant.

7. The invention of claim 3 wherein the handlebars further comprise:
handle grips positioned so that most riders can comfortably grip the handle grips throughout the range of handlebar angular adjustment.

8. The invention of claim 3 wherein the fixed distance is on the order of about 6".

9. The invention of claim 3 wherein the range of handlebar angular adjustment is on the order of about one quadrant.

10. The invention of claim 3 wherein the seat tube is mounted at a seat tube angle in the range of about 62° to 72° from the horizontal.

11. The invention of claim 10 wherein the seat tube angle is in the range of about 64° to 69°.

12. The invention of claim 11 wherein the seat tube angle is on the order of about 66.5°.

13. The invention of claim 10 wherein the head tube angle is on the order of about 68°.

14. The invention of claim 2 wherein the head tube is mounted at a head tube angle in the range of about 64° to 72° from the horizontal.

15. The invention of claim 14 wherein the head tube angle is in the range of about 66° to 70°.

16. The invention of claim 3 wherein the head tube is mounted at a head tube angle greater than a seat tube angle at which the seat tube is mounted.

17. The invention of claim 16 in which the head tube angle exceeds the seat tube angle by about 1.5°.

18. The invention of claim 3 wherein a rider's compartment between the saddle and handlebars changes in size substantially proportionally as the saddle height and handlebar angle are adjusted for the rider's height.

19. The invention of claim 1 wherein the handlebar rise is in the range of about 2" to about 6".

20. The invention of claim 19 wherein the handlebar rise is in on the order of about 4".

21. The invention of claim 1 wherein the fixed distance is in the range of about 4" to 8".

22. The invention of claim 1 wherein the fixed distance is on the order of about a distance of the rider's heel above the ground when the rider's foot is outstretched to reach the ground.

23. The invention of claim 1 wherein the fixed distance is on the order of about a radius of a circle through which the pedals are moved during pedaling.

24. The invention of claim 1 wherein the one or more interconnecting frame members further comprise:
 a chain stay extension frame member mounted between the chain stay frame member and the bottom bracket.

25. A method of producing bicycles, comprising:
 a bicycle frame with a straight, curved or angled seat tube frame member adjustably supporting a saddle at a range of saddle heights and mounted at a fixed distance rearward of a bottom bracket at a seat tube angle, wherein the seat tube is mounted, or a seat tube axis as extended from a saddle insertion point intersects a chain stay or a horn at a distance of about at or within a radius of a circle of revolution of the pedals;
 adding handlebars having a rise and a range of angular adjustment for rider's height; and
 using values for the distance, rise and range of angular adjustment so that saddle height and angular adjustment permit most riders to comfortably sit upright while pedaling at a proper leg extension and extend a foot flat on the ground when stopped.

26. The method of claim 25 wherein the rise is at least 2".

27. The method of claim 26 wherein the range of angular adjustment is on the order of one quadrant.

28. The method of claim 27 wherein the seat tube is mounted at an angle in the range of about 62° to 72°.

29. The method of claim 28 wherein the seat tube is mounted at an angle in the range of about 64° to 69°.

30. The method of claim 29 wherein the seat tube is mounted at an angle on the order of about 66.5°.

* * * * *